April 16, 1968  E. G. WEATHERLEY  3,378,498
PROCESS FOR DIFFUSING METAL INTO A REFRACTORY OR CERAMIC
OXIDE USING A NITRATE PROMOTER
Filed Jan. 25, 1965
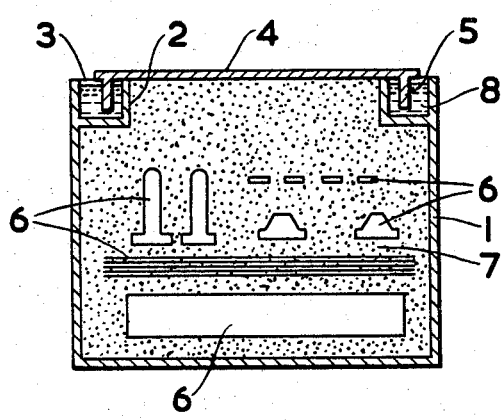

United States Patent Office 3,378,498
Patented Apr. 16, 1968

3,378,498
PROCESS FOR DIFFUSING METAL INTO A REFRACTORY OR CERAMIC OXIDE USING A NITRATE PROMOTER
Eric George Weatherley, c/o Metal Diffusions Limited, Tower Works, Fengate, Peterborough, England
Filed Jan. 25, 1965, Ser. No. 427,894
24 Claims. (Cl. 252—301.1)

The invention relates to the manufacture of a modified refractory or ceramic article, including refractory or ceramic articles suitable for use in a nuclear reactor.

According to the invention, there is provided a method of making refractory or ceramic articles which comprises bringing the article, composed for example of a silica/alumina or alumina/silica refractory, into contact with a finely divided metal or a metal compound, particularly a salt, and maintaining the metal or metal compound in contact with the article, preferably in the presence of ammonium nitrate or a nitrate of said metal, at an elevated temperature effective to permit diffusion of said metal or metal compound into the article to take place.

The article may be a body made from a refractory mass which has been slip-cast, moulded, extruded, pressed or otherwise formed to the desired shape, the shaped mass being then consolidated as by a firing or sintering operation.

The preferred metals dispersed or diffused as such or in the form of a compound in the refractory or ceramic article include uranium, thorium, cadmium, beryllium, magnesium, zirconium, titanium, lead, chromium, platinum, iridium, copper, silver, gold, barium, aluminum and boron, boron for the purposes of the present specification being regarded as a metal.

The modified refractory or ceramic article may be in a form in which it may be used as a fuel element in a nuclear reactor, the metal or metal compound diffused into the article being a fissile material, for example, uranium or plutonium.

The modified refractory or ceramic article may be in a form suitable for use as a breeder or like element in a nuclear reactor, the metal or metal compound diffused into the article in such case being one which is capable of being converted in a nuclear reactor into a fissile material. Such metal, present as such or in the form of a compound, may, for example, be uranium-238 or thorium.

Moreover, the invention permits the manufacture of a refractory or ceramic article suitable for use as a protective layer or shield or a control element in a nuclear reactor or other source of radioactivity. In such case the metal or metal compound diffused into the article will be one for example, lead, boron, a boride, cadmium or a compound of cadmium, capable of adsorbing neutrons and/or adsorbing or otherwise neutralizing radioactive particles and/or radiation emitted by a nuclear or similar source. Such modified refractory or ceramic article or articles permit a nuclear reactor to be provided with an efficient biological shield of appreciably less weight than the concrete shields at present in use.

The refractory or ceramic article itself may readily be made of material which gives rise, in a nuclear reactor, to radioactive by-products which are of less danger to life than the radioactive by-products produced, for example, from the cans in which nuclear fuel is at present charged into nuclear reactors.

The diffusion may be effected by contacting the refractory or ceramic article with the metal in finely granular or powdered form or with a compound of the metal, particularly a salt, in solution or otherwise, at a temperature which is sufficiently high to permit the diffusion to take place. The temperature may vary over a wide range, for example, 200°–1400° C. and it will depend, inter alia, upon the metal being diffused and whether the metal is in elementary form or in the form of a compound. Suitable temperatures may, however, be readily found by simple experiment.

The amount of the metal or metal compound employed may vary but will be such as to enable the desired degree of diffusion to be effected. When used in admixture with an inert diluent, the amount of the metal or metal compound (calculated as metal) preferably constitutes not less than about 4% by weight of the mixture.

The diffusion may be carried out by the "pack" method. In this method, the refractory or ceramic article is buried in a mixture comprising a solid, inert diluent or carrier and the metal, or a compound of the metal, to be diffused. The mixture and buried article is sealed in a box which is then maintained at the diffusion temperature for a determined period, for example, two to eight hours. Boron, preferably in the form of boric acid, may be present in the mixture when another metal is being diffused.

The diluent or carrier is preferably a sand of a high degree of purity, advantageously one containing not less than 99.0% of silicon dioxide and less than 0.1%, preferably less than 0.05%, of iron (estimated as ferric oxide). The particle size of the diluent or carrier will be such as to permit gaseous diffusion through its mass and advantageously not less than 70% of the diluent is of a particle size within the range 72–100 mesh B.S.S.

The mixture of diluent and metal or metal salt preferably includes one or more additives effective to facilitate the diffusion. Suitable additives include ammonium halides, particularly ammonium flouride, and ammonium nitrate. Ammonium flouride is preferably present in an amount not less than 0.1% by weight of the mixture and, when used, the other ammonium halides, of which the chloride is preferred, are present in an amount of not less than 0.01% by weight of the mixture. Ammonium nitrate is also preferably present as an additive, the quantity used being preferably not less than 0.01% by weight of the mixture.

All or part of the ammonium salts may be replaced by other substances which yield the corresponding hydrogen halides or nitrous oxide at the diffusion temperature, and when so used the other substance or substances will be used in an amount equivalent to that of the ammonium salt or salts replaced.

When boron is present in the mixture as an additive, it is preferably present as boric acid in an amount of not less than 0.1% by weight of the mixture.

With some metals and refractory or ceramic articles a greater concentration of the metal or metal salt can be achieved by the prior impregnation of the article by soaking the article in a solution of the metal salt, burying the soaked article in a mixture of the inert diluent and one or more or all of the additives hereinbefore referred to, and with or without the metal or metal salt, and then maintaining the mass for a determined period at the diffusion temperature in a sealed box. Part or all of the additive or additives may, alternatively, be present in the solution in which the article is soaked. With silica/alumina and alumina/silica based articles in particular, this method of pre-soaking, especially when the metal salt used is the acetate, has frequently resulted in articles which contain more than 99% of the diffusing metal in their surface layers.

In another method of preparing the modified refractory or ceramic article according to the invention, a solution or suspension of one or more salts of the metal or metals and/or of the metal or metals to be diffused into the article is sprayed, painted (that is, applied by means of a brush or the like) or otherwise applied to the article either in the cold or with the article at an elevated temperature, which elevated temperature may be the requisite temperature for diffusion to take place. When the temperature of the refractory or ceramic article is below the requisite temperature when the solution or suspension is applied, the article is afterwards heated to the requisite reaction temperature, that is, the temperature necessary to permit diffusion of the metal or metals and/or decomposition of the metal salt or salts. The solution of suspension preferably contains one or more of the additives hereinbefore referred to, although it will be understood that the additive or additives can be applied separately from the metal, metal salt or salts.

When the metal salt is a nitrate, fluoride acetate or chloride and ammonium nitrate, ammonium acetate, ammonium chloride or ammonium fluoride is present as an additive, or nitric acid, acetic acid, hydrochloric acid or hydrofluoric acid is present in place of or in addition to the ammonium salt or salts, then it has been found that the diffusion can generally be effected merely by spraying the solution or suspension on to the refractory or ceramic article held at the reaction temperature, or by painting or brushing or otherwise applying the solution or suspension on to the article and then raising the article to reaction temperature, that is, a temperature at which diffusion takes place. Preferably, the solution or suspension contains (i) a nitrate, either ammonium nitrate or the nitrate of the metal to be diffused, or nitric acid and (ii) an acetate, either ammonium acetate or the acetate of the metal to be diffused or acetic acid.

The proportion of additives incorporated in the suspension or solution is preferably much greater than that incorporated in the solid mix when the diffusion is to be effected by the pack method in a sealed container. Thus, for example, the additives may together constitute from 2% to 25% of the suspension or solution.

The impregnated or modified refractory material may also be made by incorporating the metal or metal compound or salt in the slurry or suspension from which shaped bodies of refractory material are normally manufactured by casting. The metal or metal compound is then preferably in a finely divided form so that it can be uniformly distributed throughout the slurry or suspension. The cast or otherwise formed refractory material is then heated at an elevated temperature, preferably in the inert diluent and one or more or all of the additives hereinbefore referred to, with or without the metal or metal compound, and preferably at a temperature in the range 650°–1400° C. in a sealed box. One or more of the additives may be used and they may be incorporated in the slurry or suspension or admixed with the inert diluent.

In addition to silica/alumina refractory and ceramic articles it will be understood that other refractories may be used, for example, magnesia-based, zirconia-based, silica-based and alumina-based refractories and the pure or substantially pure oxides themselves, namely magnesia, zirconia, silica and alumina.

When the diffusion is carried out in a box, the box is preferably sealed with a composition which is liquid at the diffusion temperature and which at that temperature is substantially saturated with respect to the metal, for example, uranium or cadmium, which is being diffused into the refractory. The sealing composition may be a liquid, a gelatinous or syrup-like mass, or a solid at atmospheric temperature and before it is applied to the box.

The invention is illustrated in the examples given hereinafter. In each of Examples 1 to 5 the sand used had the following analysis:

| | Percent by weight |
|---|---|
| $SiO_2$ | 99.20 |
| $Al_2O_3$ | 0.35 |
| $Fe_2O_3$ | 0.04 |
| CaO | 0.10 |
| MgO | 0.10 |
| $Na_2O/K_2O$ | 0.05 |
| Loss on ignition | 0.16 |
| | 100.00 |

Particle size: 82% by weight within the range 72–100 mesh B.S.S.; 0.44% by weight greater than 16 mesh B.S.S.

The diffusion in each of Examples 1 to 5 was carried out in a mild steel box or container of the kind diagrammatically illustrated in the accompanying drawing.

The box comprises a casing 1 of rectangular section having on its inner surface an integral member 2 of angle section which defines a channel 3 extending around the whole of the inner surface at the upper end of the casing. A lid 4 rests on the upper end of the member 2 and the lid has an endless, depending flange or lip 5 which extends into the channel 3.

In use, the box may be filled with a metallising composition 7 in which the refractory and ceramic articles 6 are buried. An appropriate sealing composition 8 is poured into or placed in channel 3 and the lid 4 is placed in position with its lip 5 dipping into the sealing composition 8.

EXAMPLE 1

An intimate mixture of the following ingredients:

| | Parts by weight |
|---|---|
| Chromium metal powder | 5.00 |
| Sand | 94.47 |
| Ammonium fluoride | 0.50 |
| Ammonium chloride | 0.02 |
| Ammonium nitrate | 0.01 | was placed in the box hereinbefore referred to and a number of silica/alumina refractory bricks were buried in the mixture. The refractory material of some of the bricks was rich in silica (50.1%–70% $SiO_2$, 49.9%–30% $Al_2O_3$) whilst the remainder of the bricks were rich in alumina (50.1%–70% $Al_2O_3$, 49.9%–30% $SiO_2$). The particle size of the chromium metal powder was less than 200 mesh B.S.S.

The lid was placed on the box into the channel of which was poured a liquid sealing medium consisting of a solution in 75 parts water of 100 parts sodium tetrasilicate, 100 parts sodium dichromate ($Na_2Cr_2O_7.2H_2O$) and 10 parts sodium hydroxide, all parts being by weight. This composition was liquid at the temperature (1060° C.) used for diffusion and was substantially saturated with respect to chromium at that temperature.

The sealed box was placed in a furnace maintained at 1060° C. After an initial soaking period sufficient to allow the box and its contents to reach 1060° C., the box was held in the furnace at that temperature for six hours. The box was then removed from the furnace and allowed to cool to room temperature.

The box was opened and the refractory bricks were removed for examination. It was found that diffusion of chromium metal, chromium trioxide and chromium nitrate had occurred to a depth of 6 cms. into the bricks the predominant diffused material being chromium metal.

EXAMPLE 2

An intimate mixture of the following ingredients:

| | Parts by weight |
|---|---|
| Uranium nitrate (containing water or crystallisation) | 20.0 |
| Sand | 79.4 |
| Ammonium fluoride | 0.5 |
| Ammonium nitrate | 0.1 | was placed in the box and number of slabs of a silica/alumina refractory were buried in the mixture. Some of the refractory slabs were rich in silica (50.1%–70% $SiO_2$, 49.9%–30% $Al_2O_3$) whilst the others were rich in alumina (50.1%–70% $Al_2O_3$, 49.9%–30% $SiO_2$).

The lid was placed on the box and a liquid sealing composition was poured into the channel of the box to seal it. The sealing composition consisted of sodium uranate dispersed in an aqueous solution of sodium tetrasilicate, the proportions of the constituents in the composition being such that the seal was a liquid at the diffusion temperature (1060° C.) and was substantially saturated with respect to uranium at that temperature.

The sealed box was placed in a furnace maintained at 1060° C. and after the box and its contents had reached the temperature of the furnace, the box was held in the furnace at that temperature for six hours. The box was then removed from the furnace and allowed to cool to room temperature.

The box was opened and the slabs of refractory material were removed and examined. It was found that diffusion to a depth of 1 cm. into the slabs has occured, the diffused material consisting of uranium metal and uranic oxide with a very small amount of uranium nitrate.

EXAMPLE 3

An intimate mixture of the following ingredients:

| | Parts by weight |
|---|---|
| Cadmium acetate | 30.0 |
| Sand | 69.6 |
| Ammonium fluoride | 0.3 |
| Ammonium nitrate | 0.1 | was placed in the box and silica/alumina refractory slabs of the same kind as those employed in Example 2, were buried in the mixture. The lid was placed on the box, the box being sealed by pouring into the channel of the box an aqueous solution of sodium tetrasilicate containing finely divided cadmium metal. The composition of the seal was such that it was both liquid and substantially saturated with cadmium at the diffusion temperature (1030° C.).

The sealed box was placed in a furnace maintained at 1030° C. and after the box and its contents had attained 1030° C., the box was held at that temperature for two hours.

The box was then withdrawn from the furnace, allowed to cool to room temperature and aftewards opened. The refractory slabs were removed and examined. It was found that cadmium had diffused to a depth of 4.5 cms. in each of the slabs, the cadmium being principally in the form of nitrate with some cadmium oxide.

EXAMPLE 4

| | Parts by weight |
|---|---|
| Cadmium acetate | 30.00 |
| Sand | 69.25 |
| Boric acid | 0.50 |
| Ammonium fluoride | 0.20 |
| Ammonium nitrate | 0.05 | were intimately mixed together and placed in the box. Silica/alumina refractory slabs of the same kind as those used in Example 2 were buried in the sand, the lid was applied to the box, and a sealing composition of the same kind as that employed in Example 3 was poured into the channel of the box to seal the box.

The sealed box was placed in a furnace held at 1000° C. and after an initial soaking period sufficient to allow the contents of the box to reach 1000° C., the box was maintained at that temperature for four hours. The box was then removed from the furnace and allowed to cool to room temperature.

Upon examination of the refractory slabs, it was found that cadmium had diffused into them to a depth of 4.5 cms., the cadmium being present principally as metal but with some oxide and nitrate.

EXAMPLE 5

An alumina/silica valve base having a high content of alumina (approximately 94%) was buried in the box in an intimate mixture of the following constituents:

| | Parts by weight |
|---|---|
| Chromium metal powder (particle size less than 200 mesh B.S.S.) | 25.00 |
| Ammonium fluoride | 0.30 |
| Ammonium nitrate | 0.05 |
| Ammonium chloride | 0.50 |
| Sand | 74.15 |

The box was sealed with a sealing composition which was a solution of the same composition as that used in Example 1. The sealed box was placed in a furnace maintained at 1060° C. and the box, after attaining the temperature of the furnace, was held at that temperature for six hours. The box was then removed from the furnace, allowed to cool to room temperature and opened.

Examination of the valve base showed that it had a coherent coating of chromium and that the chromium had diffused to a depth of 0.0014 inch.

EXAMPLE 6

An aqueous solution of the following composition was prepared:

| | Percent by volume |
|---|---|
| Platinic chloride | 7 |
| Platinic nitrate | 2 |
| Platinic acetate | 2 |
| Ammonium chloride | 14 |
| Acetic acid | 3 |

A small block of a high density alumina refractory containing 94% alumina was heated to approximately 200° C., and the said solution was then sprayed on to its surface. The sprayed refractory block was heated to 980° C. and held at that temperature for 2 minutes. As a result, a thin coherent film of platinum metal adhered to and diffused into the alumina surface. By one application of approximately 1 millilitre of the solution to 1 square centimetre of surface, a resultant layer of 1½ tenths of a thousandth of an inch (0.00015″) thickness of diffused metal was achieved. Upon repeated application of the solution, the refractory block being cooled each time to about 200° C. prior to application of the solution, the diffused coating was considerably increased in depth. In the second and subsequent heating operations on the sprayed block, the block was heated to 1100° C. It has been found to be generally necessary, in such second and subsequent heating operations, to employ a temperature higher than that employed in the first heating operation on the sprayed refractory blocks.

EXAMPLE 7

Small blocks of fire-brick containing 42% alumina and of different porosity were painted with the aqueous solution set forth in Example 6 and they were then heated to 720° C. and held at that temperature for 2 minutes. Depending upon the amount of liquid painted on the blocks of fire-brick and the porosity of the blocks, diffusion of pure platinum metal to coat individual grains of the blocks to a depth of up to 3 cm. was obtained with a single application.

EXAMPLE 8

An aqueous solution of the following ingredients was prepared:

| | Percent by weight |
|---|---|
| Silver acetate | 14 |
| Silver nitrate | 4 |
| Ammonium nitrate | 3 |
| Acetic acid | 5 |

A small block of 94% alumina refractory was heated to 330° C. and then sprayed with the solution. This resulted in a thin, coherent diffused coating of pure silver metal on the refractory block.

EXAMPLE 9

A small piece of 42% alumina-based fire-brick was painted with the aqueous solution prepared in Example 8 and then the temperature of the piece of fire-brick was raised to 4900 C. The individual grains of the piece of fire-brick to a depth of 15 mm., were individually coated with pure silver metal by this single application.

EXAMPLE 10

An aqueous solution containing the following ingredients, by weight, was prepared:

| | Percent |
|---|---|
| Copper acetate | 8 |
| Copper nitrate | 4 |
| Acetic acid | 7 |
| Nitric acid | 1 |
| Boric acid | 1 |

A block of 94% alumina refractory was heated to 608° C. and the solution was sprayed directly on to the block, the block being afterwards held at this temperature for some 5–7 minutes. A thin coherent film of pure copper metal containing traces of copper oxide was thereby produced on the surface of the refractory block.

EXAMPLE 11

An aqueous suspension containing the following ingredients, by weight, was prepared:

| | Percent |
|---|---|
| Aluminium metal of a particle size smaller than 200 mesh B.S.S. | 5 |
| Aluminium chloride | 12 |
| Linseed oil | 1 |
| Acetone | 7 |
| Ammonium chloride | 5 |
| Ammonium nitrate | 5 |
| Ethyl acetate | 10 |

A piece of 94% alumina refractory was heated to 580° C., and the aqueous suspension was sprayed on to the hot surface. The refractory was maintained at 580° C. for 8–10 minutes after spraying a coherent diffused coating of pure aluminium metal being thereby produced on the refractory.

I claim:
1. A method of modifying an article of the class consisting of refractory and ceramic oxide articles, which comprises: contacting the article with a member selected from the group consisting of the metals uranium, thorium, cadmium, beryllium, magnesium, zirconium, titanium, lead chromium, platinum, iridium, copper, silver, gold, barium, aluminium and boron, salts of said metals and mixtures of the foregoing, and maintaining said member in contact with the article in the presence of a promoter selected from the group consisting of ammonium nitrate and a nitrate of a metal of said member at an elevated temperature effective to permit diffusion of the metal of said member into the article.

2. A method according to claim 1, in which said member is a metal salt and the article is contacted with a solution of the metal salt.

3. A method according to claim 2, in which said metal salt is an acetate.

4. A method according to claim 1, in which the article is brought into contact with said member by coating the article with said member.

5. A method according to claim 1, in which the diffusion is effected in the presence of said promoter and an ammonium halide.

6. A method according to claim 1, in which the diffusion is effected with the article buried in a mixture comprising a particulate, inert diluent within a sealed container, said diluent serving as a carrier for said member and said promoter.

7. A method according to claim 6, in which the diluent is a sand containing not less than 99.0% silicon dioxide and less than 0.1% iron estimated as ferric oxide.

8. A method according to claim 6, in which the diffusion is effected in the presence of said promoter and ammonium fluoride, the ammonium fluoride being initially present in an amount of not less than 0.1% by weight of said mixture comprising the diluent.

9. A method according to claim 6, in which the diffusion is effected at a temperature in the range 500–1200° C.

10. A method according to claim 9, in which the temperature is in the range 900–1100° C.

11. A method according to claim 6, in which the metal of said member is selected from the group consisting of the elements chromium, uranium and cadmium.

12. A method according to claim 1, in which said member is a fissile material.

13. A method according to claim 1, in which said member is nonfissionable.

14. A method according to claim 1, in which said member is of the group consisting of borides, boric acid and salts of cadmium.

15. A method of modifying an article of the class consisting of refractory and ceramic oxide articles, which comprises applying to the article an aqueous composition comprising a member selected from the group consisting of the metals uranium, thorium, cadmium, beryllium, magnesium, zirconium, titanium, lead, chromium, platinum, iridium, copper, silver, gold, barium, aluminium and boron, salts of said metals, and mixtures of the foregoing, in the presence of a nitrate salt promoter, thereafter maintaining the article at a temperature such that diffusion into the article of part at least of said member occurs.

16. A method according to claim 15, in which the aqueous composition is sprayed on to the article when the article is itself at the temperature at which diffusion occurs.

17. A method according to claim 15, in which said metal salts are nitrates, fluorides, acetates and chlorides.

18. A method according to claim 15, in which the aqueous composition contains at least one of the compounds of the group consisting of ammonium nitrate, ammonium acetate, ammonium fluoride, nitric acid, acetic acid, hydrochloric acid and hydroflouric acid.

19. A method according to claim 15, in which the aqueous composition contains (I) a compound selected from the group consisting of ammonium nitrate, nitric acid and said member in the form of a metal nitrate and (II) a compound selected from the group consisting of ammonium acetate, acetic acid and said member in the form of a metal acetate.

20. A method according to claim 15, in which the metal of said member is a metal selected from the group consisting of uranium, cadmium, chromium, platinum, silver, copper and aluminium.

21. A method according to claim 15, in which said member is a fissile material.

22. A method according to claim 15, in which said member is nonfissionable.

23. A method according to claim 15, in which said member is of the group consisting of lead, lead salts, boron, boric acid, borides, cadmium and salts of cadmium.

24. A method according to claim 15, in which the diffusion temperature is within the range 300–1200° C.

References Cited

UNITED STATES PATENTS

| | | | |
|---|---|---|---|
| 3,147,225 | 9/1964 | Ryan | 106—55 |
| 2,698,990 | 1/1955 | Conant et al. | 29—182.5 |
| 2,729,880 | 1/1956 | Miller | 75—206 XR |
| 2,789,341 | 4/1957 | Youssov | 29—182.5 |
| 3,233,985 | 2/1966 | Kraft et al. | 75—206 |

CARL D. QUARFORTH, *Primary Examiner.*

BENJAMIN R. PADGETT, *Examiner.*

S. J. LECHERT, Jr., *Assistant Examiner.*

UNITED STATES PATENT OFFICE
CERTIFICATE OF CORRECTION

Patent No. 3,378,498            April 16, 1968

Eric George Weatherley

It is certified that error appears in the above identified patent and that said Letters Patent are hereby corrected as shown below:

Column 7, line 19, "4900 C." should read -- 490° C.

Signed and sealed this 19th day of August 1969.

(SEAL)
Attest:

Edward M. Fletcher, Jr.            WILLIAM E. SCHUYLER, JR.
Attesting Officer            Commissioner of Patents